Patented Aug. 12, 1952

2,606,901

UNITED STATES PATENT OFFICE 2,606,901

ORGANIC PHOSPHORIC ACID DERIVATIVES AND METHODS OF PREPARING THE SAME

Robert P. Parker, Somerville, Doris R. Seeger, Bound Brook, and Erwin Kuh, New Brunswick, N. J., assignors to American Cyanamid Company, New York, N. Y., a corporation of Maine No Drawing. Application July 25, 1951, Serial No. 238,583

10 Claims. (Cl. 260—239)

This invention relates to new organic compounds. More particularly, it relates to N,N'-substituted diamidophosphate esters and methods for their preparation.

It is known in the prior art to prepare esters of certain N,N'-substituted diamidophosphates (G. M. Kosolopoff, Organophosphorous Compounds, 1950, pages 310–312).

The compounds of the present invention, in contrast to those of the prior art, are N,N'-ethylendiamidophosphate esters which may contain certain substituents on a ring carbon atom of the ethylenimine rings. They may be represented by the following formula:

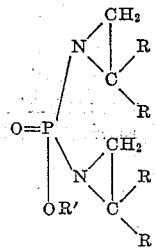

in which R represents hydrogen or a radical of the aliphatic, aliphatic-aromatic or aromatic series and R' represents a radical of the aliphatic or cycloaliphatic series containing at least four carbon atoms.

The compounds of the present invention possess chemically reactive ethylenimine rings making them useful as textile chemicals; they may be polymerized to yield new plastics. However, it is surprising that the compounds of the present invention which contain the highly reactive ethylenimine ring are so stable that they may be used as therapeutic agents.

The compounds of the present invention are, in general, low melting solids to liquids. While some of them are soluble in water, as a class they are soluble in organic solvents and those higher members of the series possess marked lipid-solubility.

These compounds can be prepared by starting with a trihalophosphoric acid such as phosphorous oxychloride or phosphorous oxybromide which is first reacted with a molecular equivalent of an alcohol of the aliphatic or cycloaliphatic series whereupon one of the halogen atoms is replaced. The intermediate dihalophosphate ester is then reacted with two molecular equivalents of an ethylenimine compound to produce the desired esters. These general reactions may be illustrated by the following equations:

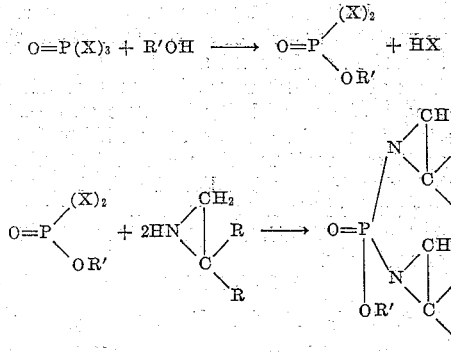

in which X is halogen and R and R' are as previously defined. In the above reaction the alcohols used in the first step may be alcohols such as: n-butyl alcohol, isobutyl alcohol, secondary butyl alcohol, isoamyl alcohol, octyl alcohol, dodecyl alcohol, benzyl alcohol, cyclohexanol, cyclopentanol and the like. The ethylenimine may be a compound which as ethylenimine itself or C-substituted ethylenimines such as 2-methylethylenimine; 2,2-dimethylethylenimine; 2-ethylethylenimine; 2-propylethylenimine; 2,2-diethylethylenimine; 2-phenylethylenimine; 2-propyl-2-phenylethylenimine; etc. These ethylenimine intermediates may be prepared by known procedures such as the ring closure with an alkali metal hydroxide of the corresponding 2-haloethylamine or sulfuric ester of the corresponding 2-hydroxyethylamine.

The reaction to prepare the intermediate dihalophosphate esters is carried out in the presence of the alcohol which is generally a liquid and also other solvents such as diethyl ether, dipropyl ether, etc. The solvent is then removed and the dihalophosphate ester reacted with an ethylenimine. This latter reaction is preferably carried out in a hydrocarbon solvent such as benzene, toluene, xylene, etc. In addition to the hydrocarbon solvent it is necessary also to have present an acid acceptor in the form of a tertiary amine such as triethylamine, N-ethylmorpholine or pyridine. The tertiary amine can usually be easily separated in the form of its hydrohalide salt which is a by-product of the reaction. The hydrocarbon solvent can then be removed and the product purified by crystallization from a suitable solvent or by distillation.

The reaction is generally carried out at a temperature within the range of 0° C. to about 60° C.

At this temperature range the reaction is usually complete within a period of a few minutes up to several hours.

The following examples illustrate the preparation of organic phosphoric acid derivatives of the present invention. All parts are by weight unless otherwise indicated.

EXAMPLE 1

*Octyl N,N'-diethylenediamidophosphate*

19.6 parts of n-octyl alcohol is added during a period of 30 minutes to a solution of 23 parts of phosphorous oxychloride in 70 parts of absolute ether at 5°–10° C. After standing overnight at room temperature, the ether is removed by distillation and the mixture refluxed for two hours (50° C.). The residue is heated to 82° at 13 mm. of mercury to remove unreacted octyl alcohol and then used directly in the condensation with ethylenimine.

A solution of 31 parts of the crude n-octyl dichlorophosphate in 44 parts of dry benzene is treated with four parts of Darco (activated charcoal), clarified and added slowly to a mixture of 11.5 parts of ethylenimine, 27.5 parts of triethylamine and 97 parts of dry benzene at 5°–10° C. Agitation is continued for an additional three hours without cooling, after which the triethylamine hydrochloride is filtered off. Benzene is removed under reduced pressure and the product collected by distillation at 117°–119° at 0.2–0.24 mm. of mercury.

EXAMPLE 2

*Butyl N,N'-diethylenediamidophosphate*

A solution of 24 parts of n-butyl dichlorophosphate in 44 parts of dry benzene is added slowly to a mixture of 11.5 parts of ethylenimine, 27.5 parts of triethylamine and 97 parts of dry benzene at 5°–10° C. Agitation is continued for an additional three hours without cooling, after which the triethylamine hydrochloride is filtered off. Benzene is removed under reduced pressure and the product collected by distillation at 116°–118° at 1.0–1.2 mm. of mercury.

We claim:

1. Compounds of the group having the general formula:

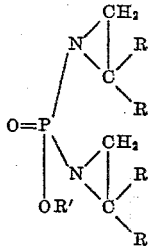

in which R is a member of the group consisting of hydrogen and lower alkyl radicals and R' is an alkyl radical containing 4 to 12 carbon atoms inclusive.

2. Compounds of the group having the general formula:

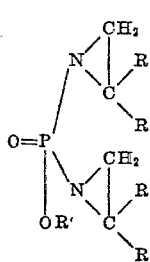

in which R is a lower alkyl radical and R' is an alkyl radical having from four to twelve carbon atoms inclusive.

3. Compounds having the general formula:

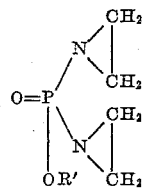

in which R' is an alkyl radical having from four to twelve carbon atoms inclusive.

4. Butyl N,N'-diethylenediamidophosphate.

5. Octyl N,N'-diethylenediamidophosphate.

6. A method of preparing compounds having the formula:

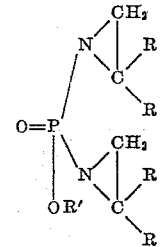

in which R is a member of the group consisting of hydrogen and lower alkyl radicals and R' is an alkyl radical containing 4 to 12 carbon atoms inclusive which comprises reacting a compound having the formula:

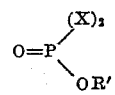

in which X is halogen and R' is as defined above with a compound having the formula:

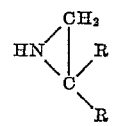

in which R is as defined above, and recovering said compound therefrom.

7. A method of preparing compounds having the formula:

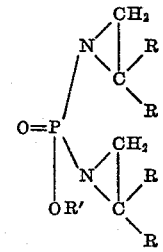

in which R is a lower alkyl radical and R' is an alkyl radical having from four to twelve carbon atoms inclusive which comprises reacting a compound having the formula:

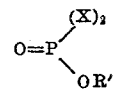

in which X is halogen and R' is as defined above with a compound having the formula:

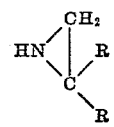

in which R is as defined above, and recovering said compound therefrom.

8. A method of preparing compounds having the formula:

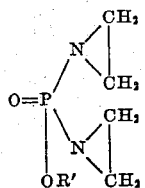

in which R' is an alkyl radical having from four to twelve carbon atoms inclusive which comprises reacting a compound having the formula:

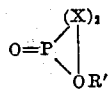

in which X is halogen and R' is as defined above with ethylenimine, and recovering said compound therefrom.

9. A method of preparing butyl N,N'-diethylenediamidophosphate which comprises reacting butyl dichlorophosphate with ethylenimine in a hydrocarbon solvent in the presence of a tertiary amine and recovering said compound therefrom.

10. A method of preparing octyl N,N'-diethylenediamidophosphate which comprises reacting octyl dichlorophosphate with ethylenimine in a hydrocarbon solvent in the presence of a tertiary amine and recovering said compound therefrom.

ROBERT P. PARKER.
DORIS R. SEEGER.
ERWIN KUH.

REFERENCES CITED

The following references are of record in the file of this patent:

UNITED STATES PATENTS

| Number | Name | Date |
| --- | --- | --- |
| 2,160,841 | Dreyfus | June 6, 1939 |
| 2,372,244 | Adams et al. | Mar. 27, 1945 |